United States Patent [19]

Kita et al.

[11] Patent Number: 4,926,816
[45] Date of Patent: May 22, 1990

[54] ROTARY PISTON ENGINE

[75] Inventors: Tatsuya Kita; Takuro Shigemura; Setsuo Nakamura, all of Hiroshima; Hisanori Nakane, Higashihiroshima, all of Japan

[73] Assignee: Mazda Motor Corporation, Hiroshima, Japan

[21] Appl. No.: 285,982

[22] Filed: Dec. 19, 1988

[30] Foreign Application Priority Data

Dec. 21, 1987 [JP] Japan .............. 62-192658[U]

[51] Int. Cl.⁵ .................. F01N 3/32; F02B 53/00
[52] U.S. Cl. ................................................ 123/203
[58] Field of Search ............... 60/304; 123/202, 203, 123/242

[56] References Cited

U.S. PATENT DOCUMENTS 3,464,394  9/1969  Satoh ............................. 123/203
3,483,849 12/1969  Yamamoto ...................... 123/203
3,913,535 10/1975  Green ............................. 123/203
4,116,190  9/1978  Kikura et al. .................. 123/202

FOREIGN PATENT DOCUMENTS 1451733  7/1969  Fed. Rep. of Germany ...... 123/203
  57005  5/1979  Japan ............................. 123/203
 211531 12/1983  Japan ............................. 123/203

Primary Examiner—Michael Koczo
Attorney, Agent, or Firm—Fleit, Jacobson, Cohn, Price, Holman & Stern

[57] ABSTRACT

A rotary piston engine having a casing and a substantially triangular rotor disposed in the trochoidal cavity of the casing. The casing is provided with an intake port located to communicate with the intake working chamber and an exhaust port located to communicate with the exhaust working chamber. The exhaust port has an air nozzle discharging air or air-fuel mixture into the leading part of the exhaust working chamber at the leading end of the exhaust port.

18 Claims, 6 Drawing Sheets

ROTARY PISTON ENGINE

BACKGROUND OF THE INVENTION (a) Field of Invention

The present invention relates to rotary piston engines, and, more particularly, to rotary piston engines having means for expelling combustion gas from working chambers.

(b) Prior Art

Conventional Wankel type of rotary piston engines comprises a casing which includes a rotor housing having an inner wall of trochoidal configuration and a pair of side housings gas-tightly secured to the opposite sides of the rotor housing to define a rotor cavity of trochoidal configuration. A substantially polygonal rotor is disposed in the rotor cavity for rotation with its apex portions in sliding contact with the inner wall of the rotor housing to define working chambers between the inner wall of the rotor housing and flanks of the rotor. Each working chamber is, therefore, displaced along the inner wall of the rotor housing as the rotor rotates and has a volume which varies in dependence upon the rotation of the rotor through intake, compression, expansion and exhaust strokes. The casing is formed with one or more intake ports located to open to the working chamber which is in the intake stroke so that air or air-fuel mixture may be introduced therein. The casing is also formed with an exhaust port located to open to the working chamber which is in exhaust stroke.

In this type of rotary piston engine, it has been experienced that a certain amount of combustion gas is carried over into the working chamber resulting in a dilution of air-fuel mixture. Such dilution of air-fuel mixture often causes misfiring and possibly results in rough engine operation. Such carry-over of combustion gas is mainly caused by the fact that the rotor drives residual gas toward the intake area of the engine. Referring to one of the working chambers, a certain amount of combustion gas remains therein at the end of the exhaust stroke because the combustion gas is not completely exhausted through the exhaust port. Such residual combustion gas is carried by the rotating rotor to a position where the intake stroke takes place and is mixed with the intake air or air-fuel mixture introduced through the intake port into the intake working chamber.

Combustion gas is additionally introduced into the intake working chamber by overflow from the exhaust port. As well known in the art, in this type of rotary piston engine, there is a so-called overlap period wherein a working chamber simultaneously communicates with both of the intake and exhaust ports. It has widely been recognized that in this overlap period the combustion gas in the exhaust port is allowed to flow through the exhaust port into the intake working chamber.

The absolute amount of combustion gas thus carried over into the intake working chamber is thought to be significantly unaffected no matter how the charging efficiency of the engine is. Therefore, the carry-over ratio, that is, the ratio of the amount of such carried over combustion gas to the amount of total intake gas, is increased substantially proportionally to a decrease in the charging efficiency. On the other hand, the allowable limit of the carry-over ratio, which is defined as the maximum carry-over ratio where the number of misfires can be suppressed under 10 times per minute, will be decreased in response to a decrease of charging efficiency. Furthermore, the allowable limit of the carry-over ratio has a tendency to abruptly decrease in a lower range of the charging efficiency.

Thus, it has been recognized that there is a threshold where the actual carry-over ratio exceeds the allowable limit at a certain value of the charging efficiency. Under such conditions, beyond the allowable limit, there will be a significant increase in the possibility of misfire and in some adverse circumstances the engine may fail to operate. In order to prevent the above-mentioned problems, it has been required to maintain the charging efficiency at an adequately large value so that the actual carry-over ratio is always smaller than the allowable limit.

For the sake of recent improvements of internal combustion engines in respect of engine efficiencies, such as gas-tightness and frictional resistances, the requirements on the charging efficiency for maintaining idling operation have been moderated. However, the charging efficiency in idling operation has still been maintained at a relatively high value for the purpose of preventing misfire.

One example concerning this problem is disclosed in Japanese Pat. No. 53-39926 (corresponding to U.S. Pat. No. 4,116,190). This patent teaches that the casing should be provided with a take-out port located to open the compression working chamber for drawing compressed air from the compressing working chamber and a discharge port located between an intake port and an exhaust port to the exhaust working chamber, and that the take-out port should be connected through a throttle-controlled valve with the discharge port. However, the discharge port is not able to be widened enough because a large discharge port allows large amounts of combustion gas to flow from the exhaust working chamber to the intake working chamber while apexes of the rotor pass the discharge port.

Another example is disclosed in Laid-Open Japanese Utility Model Application No. 60-0149836. This application teaches that a port insert being inserted into the exhaust port should have the air discharge passage at the leading end of the port insert. The air discharged from the air discharge passage forms an air curtain separating the working chamber just changing from exhaust stroke to intake stroke into the leading side and the trailing side, and prevents combustion gas from being carried over. However, since the air discharge passage is merely located at the leading side of the exhaust port, most air is exhausted with the combustion gas, and the air curtain is destroyed if the amount of air used is small. Thus, the air curtain needs a great amount of air, and large power needs to be expended to supply the air from the air pump thereby consuming much energy.

SUMMARY OF THE INVENTION

Accordingly, an object of the present invention is to provide a rotary piston engine having means for expelling combustion gas from working chambers by discharging a small amount of air into the exhaust working chamber to prevent combustion gas from being carried over to the intake working chamber.

The aforementioned object is achieved by the novel construction as follows. A rotary piston engine is comprised of a casing which includes a rotor housing having an inner wall of trochoidal configuration and a pair of side housings secured to the opposite sides of the rotor housing to define a rotor cavity of trochoidal configuration having a major axis and a minor axis. A substantially polygonal rotor is disposed in the rotor cavity for rotation with its apex portions in sliding contact with the inner wall of the rotor housing to define, between the inner wall of the rotor housing and flanks of the rotor, working chambers which are displaced along the inner wall of the rotor housing as the rotor rotates with the volumes of the working chambers varying in dependence upon the rotation of the rotor through intake, compression, expansion and exhaust strokes. An intake port is provided in the casing to open to the one of the working chambers which is in the intake stroke. An exhaust port is provided in the casing to open to the one of the working chambers which is in the exhaust stroke. A gas discharge device discharges air or air-fuel mixture from a leading end of the exhaust port into the working chamber which is in the exhaust stroke, and a nozzle discharges gas into a leading side of the working chamber.

According to the above-mentioned novel construction for a rotary piston engine, gas (air or air-fuel mixture) can be gathered to create an effective gas curtain in the leading part of the working chamber, which is changing from the exhaust stroke to the intake stroke, whereby the amount of combustion gas which is being carried over to the intake combustion chamber is substantially decreased.

DESCRIPTION OF THE PREFERRED EMBODIMENTS

Preferred embodiments of the present invention will now be described in detail with reference to the drawings.

First Preferred Embodiment

Figure 1:
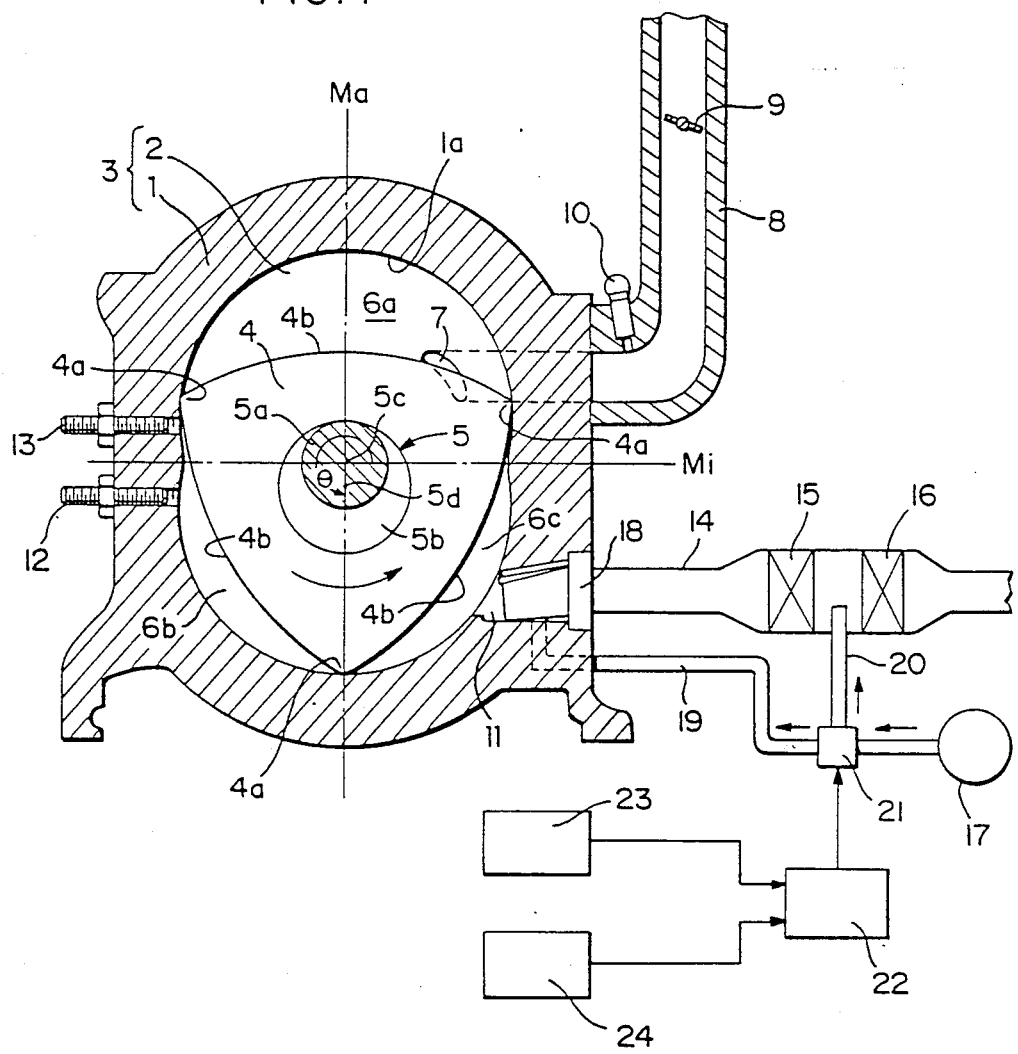
FIG. 1 is a cross-sectional view through the median plane of a rotary piston engine constructed in accordance with a first embodiment of the present invention.

Referring now to FIG. 1, the rotary piston engine shown therein comprises a casing 3 which includes a rotor housing 1 having an inner wall 1a of trochoidal configuration and a pair of side housings 2 secured to the opposite sides of the rotor housing 1. A substantially triangular rotor 4 is disposed in casing 3. Rotor 4 is rotatable in the casing with its apex portion 4a in sliding contact with the inner wall 1a of the rotor housing 1. Thus, there are defined in the casing 3 working chambers 6a, 6b and 6c of variable volume between flanks 4b of the rotor 4 and the inner wall 1a of the rotor housing 1.

The triangular rotor 4 is supported by an eccentric shaft 5 having an output shaft portion 5a and an offset rotor support portion 5b. The output shaft portion 5a has a rotational axis 5c which is coaxial with the center axis of the trochoid, and the rotor support portion 5b has a rotational axis 5d which is offset from the rotational axis 5c but coaxial with the center of the rotor 4. The trochoid which defines the inner wall 1a of the rotor housing 1 has a major axis Ma and a minor axis Mi and the angular position of the triangular rotor 4 can be designated in terms of an angle $\theta$, for example, between the minor axis Mi and a line passing through the axes 5c and 5d of the eccentric shaft 5. Such angle $\theta$ may hereinafter be referred to as the angular position of the eccentric shaft. FIG. 1 shows the condition of $\theta = 270°$.

In the illustrated embodiment, one of the side housings 2 is formed with an intake port 7 and the rotor housing 1 is provided with an exhaust port 11 and two ignition plugs 12, 13. One ignition plug 12 is located at the leading side of the minor axis Mi, that is, the forward side of the minor axis Mi extending in the direction of the rotor rotation. The other ignition plug 13 is located at the trailing side of the minor axis Mi, that is, the opposite side of the minor axis Mi.

The intake port 7 is connected with an intake passage 8 having a throttle valve 9 and a fuel injector 10.

The above-mentioned structure constitutes the well known basic structure of a Wankel-type rotary piston engine and needs no further elaboration.

The exhaust port 11 is connected with an exhaust passage 14 which is provided with a catalytic converter, such as, rhodium units 15, 16. An insert 18 is inserted into the exhaust port 11, as more clearly shown in FIGS. 2 and 3. The insert 18 and the exhaust passage 14 between two catalytic converter rhodium units 15, 16 are connected to air supplying passages 19, 20 which are connected in common with air pump 17 via an air control valve 21 controlling whether air should be supplied to the air passage 19 or to the air passage 20, or air should be stopped. A conventional control unit 22 controls the air control valve 21 in accordance with data of throttle valve opening from a throttle valve opening sensor 23 and engine speed from an engine speed sensor 24 in a novel manner as will be explained hereinafter.

Figure 2:
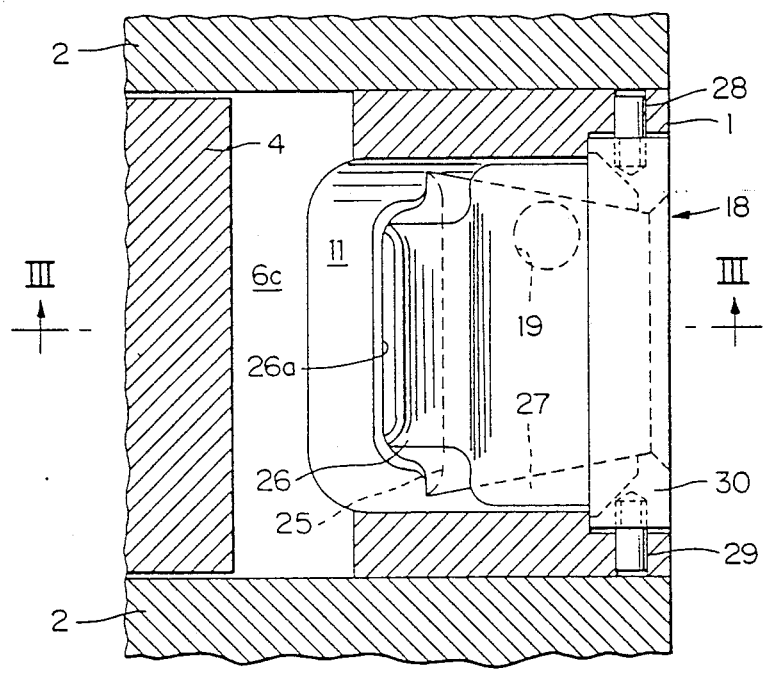
FIG. 2 is a plan view partly in section showing in detail the exhaust port structure in the novel rotary piston engine shown in FIG. 1.
Figure 3:
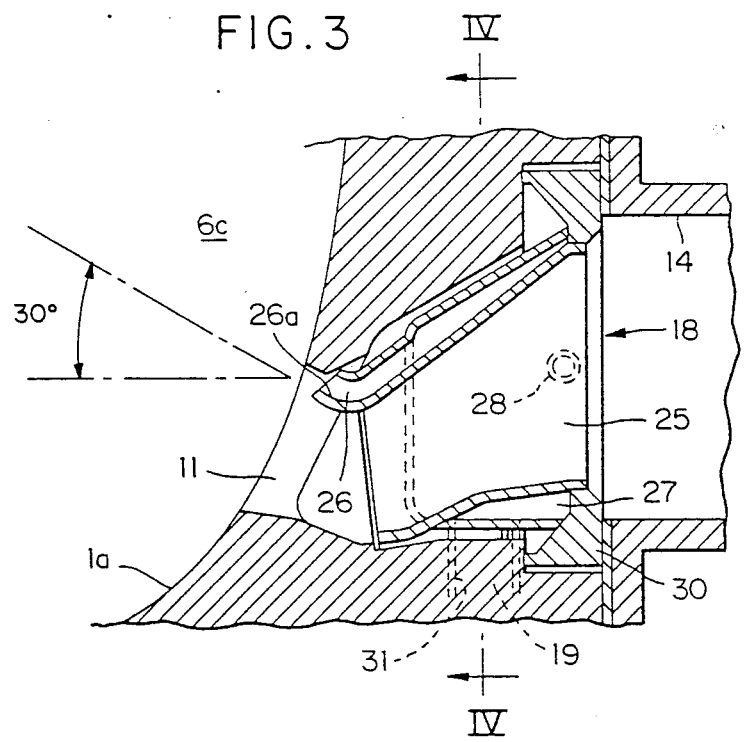
FIG. 3 is a cross-sectional view taken along line III—III of FIG. 2.
Figure 4:
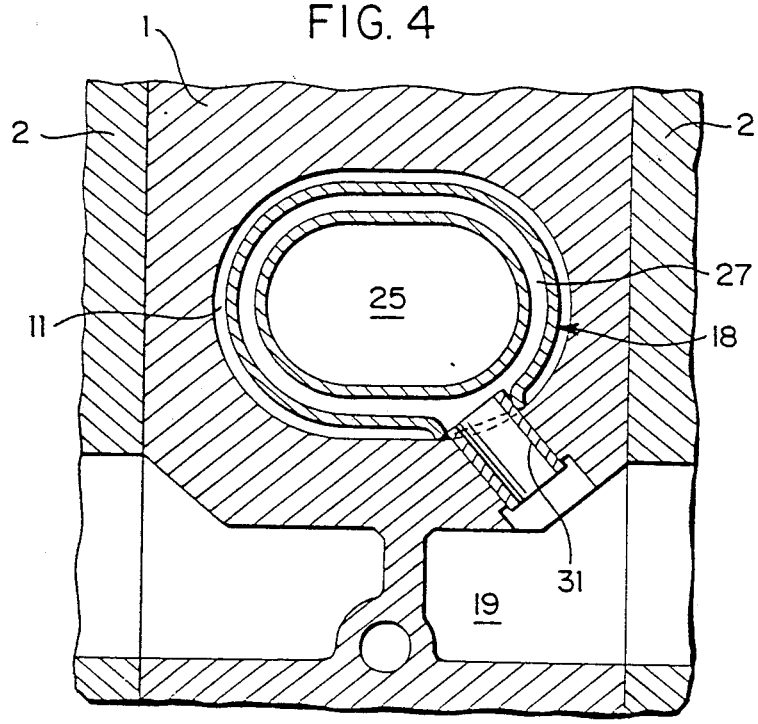
FIG. 4 is a cross-sectional view taken along line IV—IV of FIG. 3.

Referring to FIGS. 2, 3 and 4, the insert 18 has an exhaust port passage 25 which is located at the trailing side in the exhaust port 11 and is designed to decline toward the trailing side; that is, it is desirable to decline the exhaust port passage 25 downwardly as shown in FIG. 3. An air injection passage 26 with inner end communicating with an air nozzle 26a is located at the leading side in the exhaust port 11 and is smaller than the exhaust port passage 25. A ring passage 27 surrounds the exhaust port passage 25 and connects the air supplying passage 19 to the air injection passage 26. Pins 28, 29 fix the insert 18 to the rotor housing 1. A flange 30 receives the inserted pins 28 and 29. A guide pipe 31 guides air into the ring passage 27. The air supplying passage 19 is connected with the trailing end of the ring passage 27. Injection direction of air nozzle 26a is designed to be substantially normal to flank 4b of the rotor 4 when it is in a position of intake bottom dead center. The rotor 4 of FIG. 1 is shown in a position of intake bottom dead center.

In this embodiment, therefore, injection direction of the air nozzle 26a inclines 30° upwardly to the minor axis Mi. The air nozzle 26a is directed to the leading side of the exhaust port 11.

Figure 5:
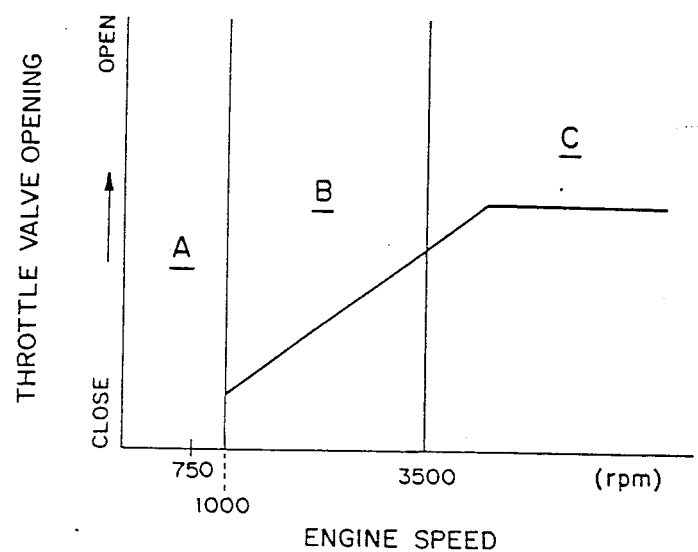
FIG. 5 is a graph showing operational conditions of an air supplying pattern for the first embodiment.

The control unit 22 controls the air control valve 21 in accordance with a map as shown in FIG. 5. When engine speed is less than 1000 rpm (this is a value which is a little higher than an idling engine speed of 750 rpm) or an engine load is less than a no-load line which corresponds to region A of FIG. 5, the air supplying passage 19 is supplied air. No load line means the balancing point where the engine itself maintains stable rotation at each engine speed. When engine speed is between 1000 rpm and 3500 rpm and engine load is no-load or more, i.e., the operational condition is in B of FIG. 5, the air supplying passage 20 is supplied air. The catalytic converter rhodium unit 15 clears oxides of nitrogen, carbon monoxide and hydrocarbon, and the catalytic converter rhodium unit 16 clears the rest of carbon monoxide and hydrocarbon. Otherwise, i.e., the operational condition is in C of FIG. 5, the air is stopped and no longer supplied to either air supplying passage 19 or 20.

When the operational condition is in A of FIG. 5, air is supplied from air pump 17, via the air supplying passage 19, the ring passage 27, and the air injection passage 26, to the working chamber 6c. The air nozzle 26a is directed to the leading side of the exhaust port 11 and prevents combustion gas, to be exhausted, from interfering with the air curtain formed by the discharged air. Further, when air passes through the ring passage 27, the air is heated by the exhaust port passage 25 and expands and then is discharged from the air nozzle 26a. Therefore, the air curtain needs less air to effectively expel combustion gas from the working chamber and to prevent combustion gas from being carried over to the intake working chamber.

Second Preferred Embodiment

Figure 6:
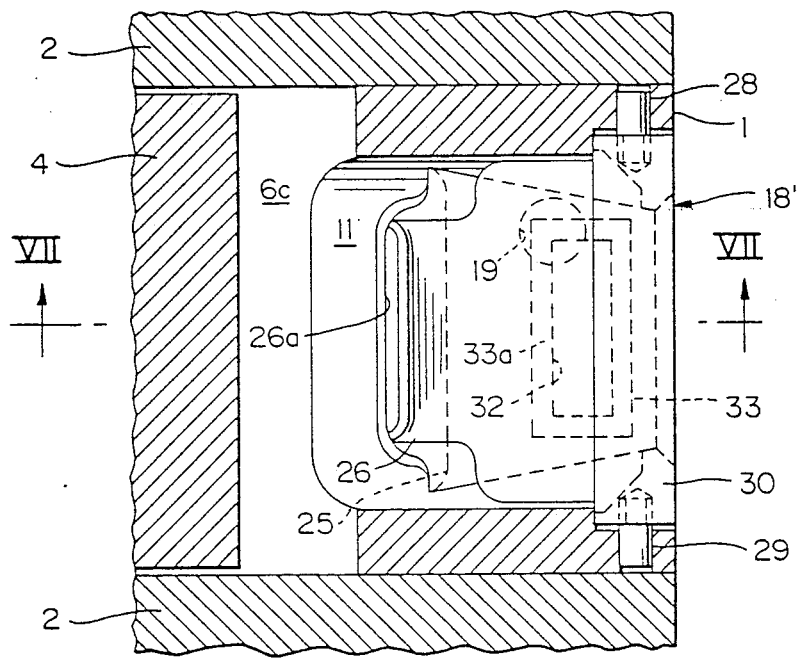
FIG. 6 is a plan view similar to FIG. 2 showing an exhaust port structure in a rotary piston engine in accordance with a second embodiment of the present invention.
Figure 7:
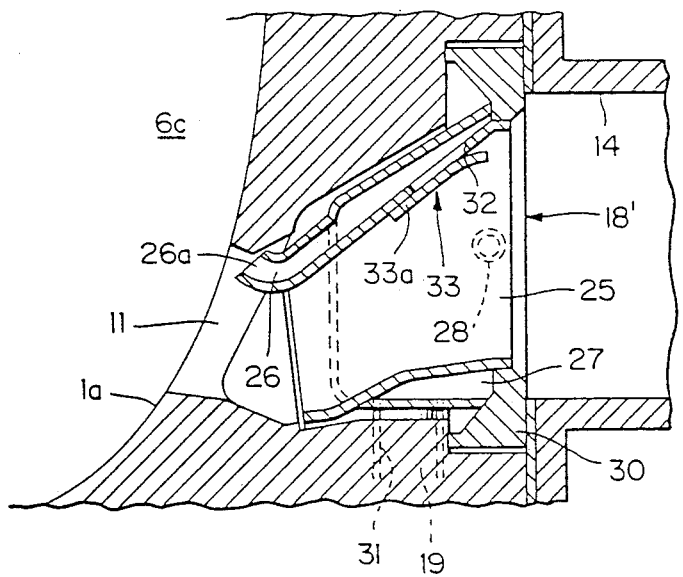
FIG. 7 is a cross-sectional view taken along line VII—VII of FIG. 6.

Another embodiment for expelling combustion gas from the working chambers will now be described with reference to an insert 18' shown in FIGS. 6 and 7. The insert 18' has a penetration port 32 connecting the exhaust port passage 25 with the air injection passage 26. A reed valve 33 has its lower end 33a fixed on the edge of the penetration port 32. When pressure in the exhaust working chamber 6c is high, the reed valve 33 opens, and the air injection passage 26 can be utilized to exhaust combustion gas and reduce exhaust resistance. The structure is otherwise the same as the first embodiment, and, therefore, the same reference numbers are used in FIGS. 6 and 7.

Third Preferred Embodiment

In the foregoing embodiments, the air supplying passage 19 is connected with the trailing end of the ring passage 27. However, as shown in FIGS. 8 and 9, the air supplying passage 19" can be directly connected with the leading end of the air injection passage 26", the ring passage can be omitted, the air nozzle 26"a can be stretched or widened toward the exhaust working chamber 6c, and the air nozzle 26"a can have an air guide 34 at its center in the transverse direction to guide air toward inner walls of the side housings 2.

Figure 8:
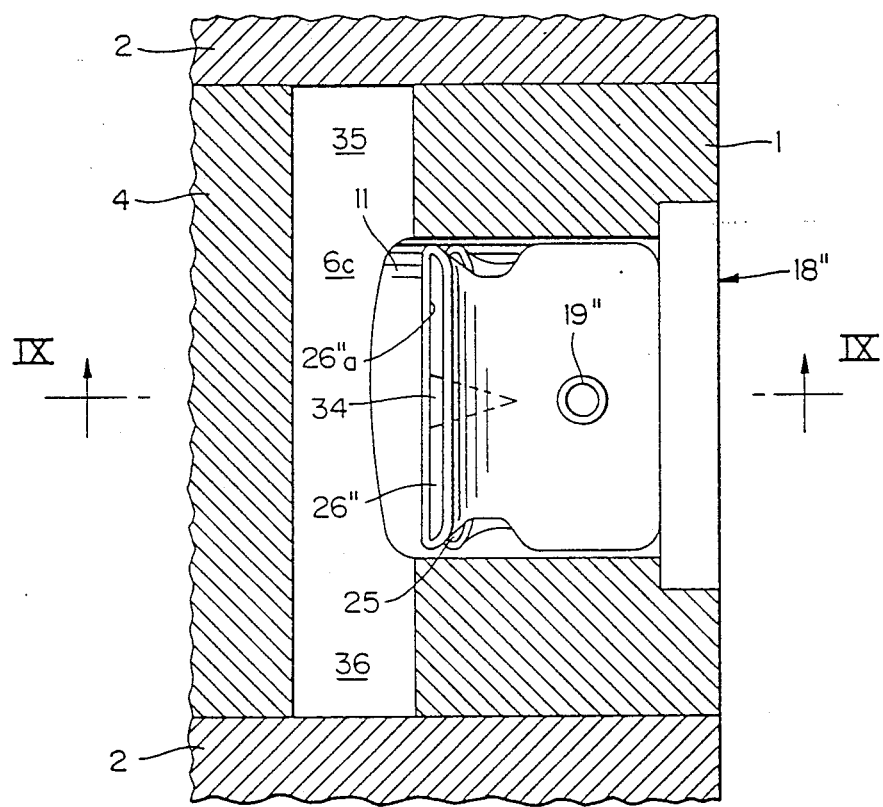
FIG. 8 is a plan view similar to FIG. 2 showing an exhaust port structure in a rotary piston engine in accordance with a third embodiment of the present invention.
Figure 9:
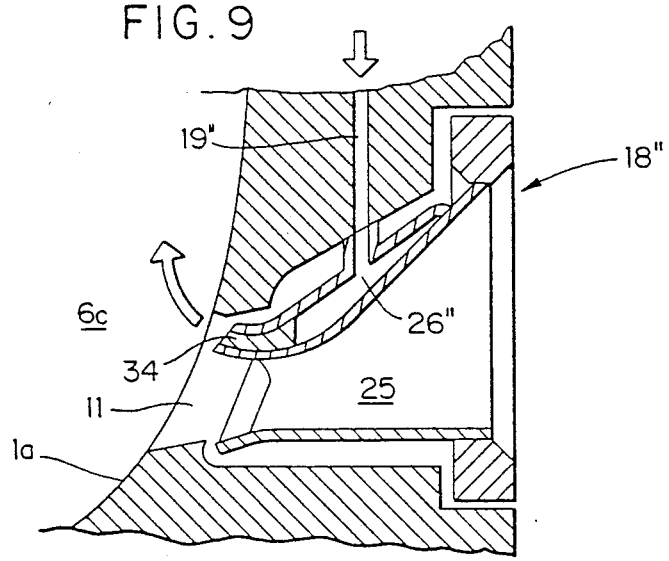
FIG. 9 is a cross-sectional view taken along line IX—IX of FIG. 8.
Figure 10A:
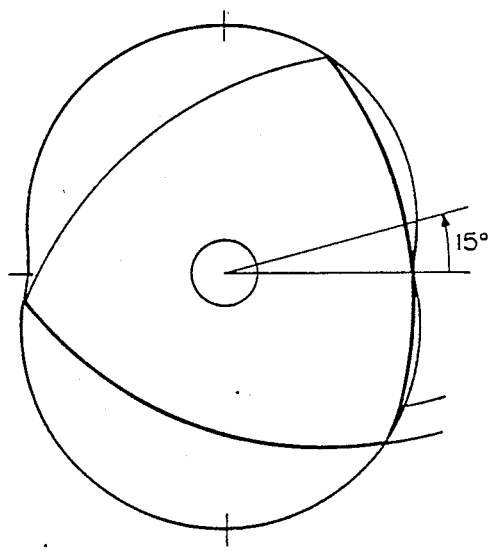
FIGS. 10(a), 10(b), 10(c) and 10(d) show schematically the opening and closing timings of the exhaust port and the intake port according to the teachings of the present invention.
Figure 10B:
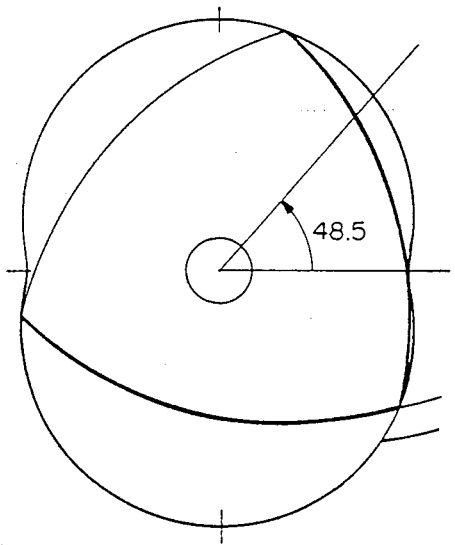
Figure 10C:
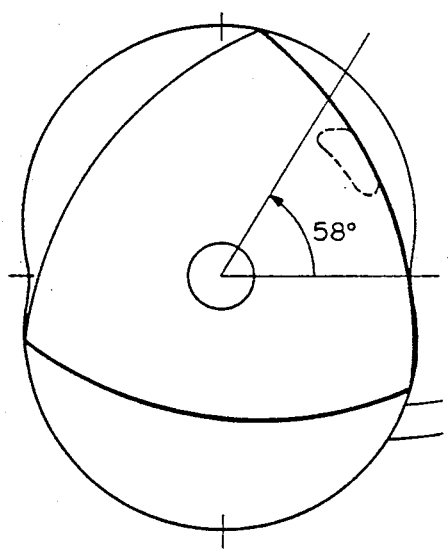
Figure 10D:
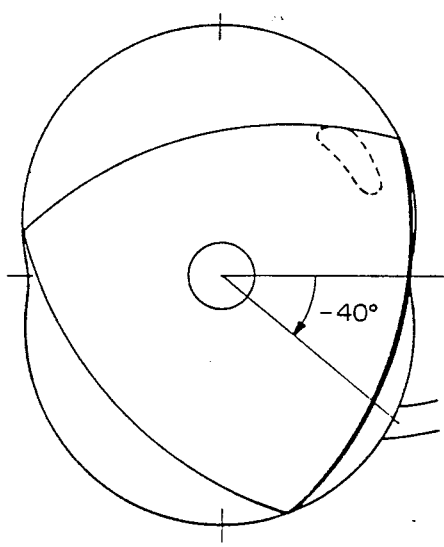

Therefore, insert 18" shown in FIGS. 8 and 9 has a simple structure. Stretch or widening of the air nozzle 26"a and the air guide 34, located at the center of the air nozzle 26"a, supplies air to corners 35 and 36 of the exhaust working chamber 6c. Thus, combustion gas is expelled efficiently from the exhaust working chamber 6c, especially from the corners 35 and 36, by a relatively small amount of air.

Experimental Comparison Between the Present Invention and Prior Art (Laid-Open Japanese Utility Model Application No. 60-149836)

Following Table I is the result of the experiments showing the difference of idling stability between the present invention and prior art.

TABLE I

|  | Present Invention | Prior Art (i) w/overlap | (ii) w/o overlap |
|---|---|---|---|
| Ex. open | $\theta = 15°$ | ← | ← |
| Ex. close | $\theta = 48.5°$ | ← | ← |
| In. open | $\theta = 58°$ | $\theta = 45°$ | $\theta = 58°$ |
| In close | $\theta = -40°$ | ← | ← |
| Nozzle angle | $+30°$ | $-10°$ | ← |
| Idling Stability | Idling at 500 rpm OK | Idling at 500 rpm NG | Idling at 650 rpm OK |

(Other Condition)

The rotary piston engine used is equipped with automatic transmission and turbo charger.

Above experiment is performed under the 0-range operating condition of the automatic transmission.

FIGS. 10(a), 10(b), 10(c) and 10(d) show exhaust port open timing, exhaust port close timing, intake port open timing and intake port close timing of the present invention, respectively.

As previously noted, in the novel structure of the present invention, nozzle angle is set to be $+30°$, where as according to the prior art, the nozzle angle is set to be $-10°$. Two cases were experimented, (i) with overlap between exhaust port close timing and intake port open timing, and (ii) without overlap between exhaust port close timing and intake port open timing.

As a result, idling stability of the present invention is achieved at 500 rpm. This value is 150 rpm less than that of prior art. This means 30% reduction of fuel consumption is idling condition. No difference between (i) with overlap and (ii) without overlap in the prior art case was found. Therefore, it was concluded that nozzle angle itself has a strong affect on idling stability.

In accordance with the present invention, nozzle angle 30° is determined according to the following relation; i.e., the nozzle is designed so as to be substantially normal to that flank of the rotor which is in a position of intake bottom dead center ($\theta = 270°$). This setting is desirable to create an effective air curtain during the latter half of exhaust stroke beginning after the rotor passes around $\theta = 270°$. Because of the flank of the rotor reflects air injected from the nozzle toward the leading side, air curtain can be effectively created at least during the latter half of exhaust stroke, which is considered to be the important period of time to prevent combustion gas from being carried over into the intake working chamber.

One of the essential features for preventing the injected air from being interfered with by combustion gas can be described as follows; i.e., the nozzle is designed to incline toward the leading direction with respect to the exhaust port passage so that air discharged from the nozzle is not interfered with by combustion gas exhausted through the exhaust port passage. Therefore, the nozzle agent must be set at more than +10°, to obtain a significant difference in idling stability.

In accordance with the present invention as described above, there is provided a rotary piston engine having means for expelling combustion gas from working chambers by discharging air into a leading part of an exhaust working chamber that needs only a relatively small amount of air to prevent combustion gas from being carried over into an intake working chamber.

The invention has thus been shown and described with reference to specific embodiments; however, it should be noted that the invention is in no way limited to the details of the illustrated structures but changes and modifications may be made without departing from the spirit and scope of the appended claims.

We claim:

1. A rotary piston engine comprising a casing including a rotor housing having an inner wall of a trochoidal configuration and a pair of side housings gas-tightly secured to the opposite sides of the rotor housing to form a rotor cavity therein, a substantially polygonal rotor disposed in said casing with apex portions in sliding contact with the inner wall of the rotor housing to define working chambers of which the volumes cyclically change to conduct intake, compression, expansion and exhaust strokes as the rotor rotates, an intake port provided in said casing to communicate with the working chamber in the intake stroke, an exhaust port provided in said casing to communicate with the working chamber in the exhaust stroke, air supplying means for supplying air comprising an air pump and an air supplying passage connecting said air pump and said exhaust port, an insert comprising a hollow body located in said exhaust port, an exhaust port passage provided in the hollow body with its inner end located in the trailing part of said exhaust port and an air injection passage provided in the hollow body with its inner end located in the leading part of said exhaust port, said air injection passage being connected with said air supplying passage, nozzle means being located at the inner end of said air injection passage for discharging air into the leading side of the working chamber which is in the exhaust stroke.

2. A rotary piston engine in accordance with claim 1 in which said hollow body of said insert has a ring passage surrounding said exhaust port passage and being connected with said air injection passage at one end and said air supplying passage at the other end.

3. A rotary piston engine in accordance with claim 2 in which said air supplying passage is connected with the trailing end of said ring passage.

4. A rotary piston engine in accordance with claim 1 further comprising control means for controlling said air injection passage to supply air into said working chamber in response to sensing the rotary piston engine in the idling operational condition.

5. A rotary piston engine in accordance with claim 4 in which said control means controls said air injection passage to supply air into said working chamber in response to sensing engine speed lower than a predetermined speed which is higher than the idling speed or engine load lower than a predetermined load.

6. A rotary piston engine in accordance with claim 1 in which said hollow body of said insert has penetration port means for connecting said exhaust port passage with the air injection passage and valve means for opening said penetration port means in response to a predetermined high pressure of the working chamber which is in the exhaust stroke.

7. A rotary piston engine in accordance with claim 1 in which the width of said nozzle means is substantially equal to the width of the inner end of said exhaust port passage.

8. A rotary piston engine in accordance with claim 1 in which said nozzle means are stretched toward the working chamber.

9. A rotary piston engine in accordance with claim 1 in which said nozzle means has guide means for guiding air toward said side housings.

10. A rotary piston engine in accordance with claim 1 in which said air supplying passage is directly connected with the leading end of said air injection passage.

11. A rotary piston engine in accordance with claim 1 in which said nozzle means is substantially normal to a flank of said rotor when at intake bottom dead center.

12. A rotary piston engine in accordance with claim 11 in which said nozzle means is inclined toward the leading direction 30° upwardly with respect to the minor axis of said rotor housing.

13. A rotary piston engine in accordance with claim 1 in which said nozzle means is inclined toward the leading direction with respect to said exhaust port passage so that air discharged from said nozzle means curtains off combustion gas exhausted through said exhaust port passage.

14. A rotary piston engine in accordance with claim 13 in which said exhaust port passage declines toward the trailing side of exhaust working chamber.

15. A rotary piston engine in accordance with claim 13 in which said exhaust port passage declines toward the trailing direction downwardly with respect to the minor axis of said rotor housing.

16. A rotary piston engine in accordance with claim 15 in which said nozzle means is inclined toward the leading direction more than 10° upwardly with respect to the minor axis of said rotor housing.

17. A rotary piston engine comprising a casing including a rotor housing having an inner wall of a trochoidal configuration and a pair of side housings gas-tightly secured to the opposite sides of the rotor housing to form a rotor cavity therein, a substantially polygonal rotor disposed in said casing with apex portions in sliding contact with the inner wall of the rotor housing to define working chambers of which the volumes cyclically change to conduct intake, compression, expansion and exhaust strokes as the rotor rotates, an intake port provided in said casing to communicate with the working chamber in the intake stroke, an exhaust port provided in said casing to communicate with the working chamber in the exhaust stroke, gas discharge means for discharging gas from the leading end of the exhaust port into the working chamber which is in the exhaust stroke including nozzle means for directing the gas to the leading side of the working chamber which is in the exhaust stroke, and said nozzle means being substantially normal to a flank of said rotor when at intake bottom dead center.

18. A rotary piston engine comprising a casing including a rotor housing having an inner wall of a trochoidal configuration and a pair of side housings gas-tightly secured to the opposite sides of the rotor housing to form a rotor cavity therein, a substantially polygonal rotor disposed in said casing with apex portions in sliding contact with the inner wall of the rotor housing to define working chambers of which the volumes cyclically change to conduct intake, compression, expansion and exhaust strokes as the rotor rotates, an intake port provided in said casing to communicate with the working chamber in the intake stroke, an exhaust port provided in said casing to communicate with the working chamber in the exhaust stroke, gas discharge means for discharging gas from the leading end of the exhaust port into the working chamber which is in the exhaust stroke including nozzle means for directing the gas to the leading side of the working chamber which is in the exhaust stroke, said nozzle means being inclined toward the leading direction with respect to said exhaust port passage so that air discharged from said nozzle means curtains off combustion gas exhausted through said exhaust port passage.

* * * * *